Patented May 10, 1932

1,857,205

UNITED STATES PATENT OFFICE

GEORGE LYNN, OF WADSWORTH, OHIO, ASSIGNOR TO PITTSBURGH PLATE GLASS COMPANY, A CORPORATION OF PENNSYLVANIA

CEMENT AND PROCESS OF MAKING IT

No Drawing.  Application filed January 3, 1930. Serial No. 418,418.

The invention relates to cements, and has for its primary object the provision of an improved cement which may be used as a satisfactory substitute for Portland cement where the cement comes in contact with solutions of calcium chloride. Under such conditions, Portland cement disintegrates and fails to give satisfactory service, while the improved cement, to which the present invention relates, withstands the action of the calcium chloride solution without excessive deterioration.

The improved cement is of the aluminous type, that is, one containing from 65 to 90 per cent of calcium aluminates, to which is added a small amount of calcium chloride, preferably about one per cent of the weight of the cement, although this may be varied within reasonable limits, depending upon the batch from which the cement is made. The use of the calcium chloride retards the setting of the cement very considerably, and results in a final product which will resist the action of calcium chloride solutions, thus differentiating such product from Portland cements and from aluminous cements which contain no calcium chloride. In order to obtain a satisfactory cure it is essential that drying out during the curing does not occur.

The invention is applicable to a wide range of aluminous cements, but, as illustrative of one to which the invention has been applied, the following analysis of a typical batch is given:

| | Per cent |
|---|---|
| Alumina | 40 |
| Lime | 40 |
| Iron oxides, silica, magnesia | 15 |
| Loss on ignition | 5 |

The calcium chloride is ordinarily dissolved in the water which is used in mixing the cement, but may be added by mixing it in pulverized form with the dry cement to which water is added in the usual way. The calcium chloride used is ordinary 80 per cent calcium chloride; i. e., a commercial product with a water content of about 20 per cent.

What I claim is:

1. A process of making a cement resistant to the action of calcium chloride solutions, which consists in incorporating into a high alumina cement after burning a small proportion of calcium chloride.

2. A process of making a cement resistant to the action of calcium chloride solutions, which consists in incorporation into a high alumina cement after burning about one per cent by weight of calcium chloride.

3. A process of making a cement resistant to the action of calcium chloride solutions, which consists in mixing with a high alumina cement whose major portion comprises calcium aluminate and water a small amount of calcium chloride.

4. A hydraulic cement formed by mixing with a high alumina cement and water a small amount of calcium chloride.

5. A hydraulic cement formed by mixing with a high alumina cement and water about one per cent by weight of calcium chloride.

6. A dry cement mix comprising a body of finely divided high alumina cement containing a small amount of pulverized calcium chloride mixed therethrough.

In testimony whereof, I have hereunto subscribed my name this 28th day of December, 1929.

GEORGE LYNN.